(12) United States Patent
Kaneshima et al.

(10) Patent No.: US 11,955,617 B2
(45) Date of Patent: Apr. 9, 2024

(54) VEHICLE BATTERY PACK

(71) Applicant: HONDA MOTOR CO., LTD., Tokyo (JP)

(72) Inventors: Ryo Kaneshima, Tokyo (JP); Kazuya Nakano, Tokyo (JP); Tsubasa Ikeya, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/682,607

(22) Filed: Feb. 28, 2022

(65) Prior Publication Data

US 2022/0302524 A1 Sep. 22, 2022

(30) Foreign Application Priority Data

Mar. 22, 2021 (JP) .................. 2021-047422

(51) Int. Cl.
| | | |
|---|---|---|
| *H01M 10/6563* | (2014.01) | |
| *H01M 10/625* | (2014.01) | |
| *H01M 10/6555* | (2014.01) | |
| *H01M 10/613* | (2014.01) | |
| *H01M 10/6556* | (2014.01) | |
| *H01M 50/204* | (2021.01) | |

(Continued)

(52) U.S. Cl.
CPC ..... *H01M 10/6563* (2015.04); *H01M 10/625* (2015.04); *H01M 10/6555* (2015.04);
(Continued)

(58) Field of Classification Search
CPC ............ H01M 10/613; H01M 10/625; H01M 10/6555; H01M 10/6556; H01M 10/6563;
(Continued)

(56) References Cited

U.S. PATENT DOCUMENTS

2002/0187390 A1 12/2002 Kimoto et al.
2012/0279792 A1 11/2012 Katano
(Continued)

FOREIGN PATENT DOCUMENTS

CN 102405147 A 4/2012
JP 2002-367684 A 12/2002
(Continued)

OTHER PUBLICATIONS

Jan. 4, 2023, Japanese Decision to Grant a Patent issued for related JP Application No. 2021-047422.

(Continued)

*Primary Examiner* — Lingwen R Zeng
(74) *Attorney, Agent, or Firm* — Paratus Law Group, PLLC

(57) ABSTRACT

A vehicle battery pack includes a first battery module and a second battery module, a fan which includes a blade body configured to rotate about a rotary shaft, the fan being configured to supply air to the first battery module and the second battery module, and a housing configured to accommodate the first battery module, the second battery module, and the fan. The first battery module and the second battery module are arranged side by side in a second direction orthogonal to the first direction. In the first battery module, the plurality of cells are bound in the first direction by a binding member. The binding member is a plate-like member which is made of metal. The fan is arranged in such a manner that the rotary shaft faces the binding member.

7 Claims, 6 Drawing Sheets

(51) Int. Cl.
    *H01M 50/244*    (2021.01)
    *H01M 50/249*    (2021.01)
(52) U.S. Cl.
    CPC ...... *H01M 10/613* (2015.04); *H01M 10/6556* (2015.04); *H01M 50/204* (2021.01); *H01M 50/244* (2021.01); *H01M 50/249* (2021.01); *Y02E 60/10* (2013.01)
(58) Field of Classification Search
    CPC ............ H01M 50/204; H01M 50/244; H01M 50/249; Y02E 60/10
    See application file for complete search history.

(56) References Cited

U.S. PATENT DOCUMENTS

2016/0293906 A1* 10/2016 Ito ....................... H01M 50/249
2018/0040933 A1    2/2018 Inoue

FOREIGN PATENT DOCUMENTS

| | | |
|---|---|---|
| JP | 2014-221625 A | 11/2014 |
| JP | 2015-046321 A | 3/2015 |
| JP | 2015-216070 A | 12/2015 |
| JP | 2015-216071 A | 12/2015 |
| JP | 2017-059356 A | 3/2017 |

OTHER PUBLICATIONS

Mar. 5, 2023, Translation of Chinese Office Action issued for related CN Application No. 202210184082.4.

* cited by examiner ion No. 2021-# VEHICLE BATTERY PACK

CROSS-REFERENCE TO RELATED APPLICATIONS

This application is based on and claims priority under 35 USC 119 from Japanese Patent Application No. 2021-047422 filed on Mar. 22, 2021.

TECHNICAL FIELD

The present disclosure relates to a vehicle battery pack.

BACKGROUND ART

In recent years, in a vehicle battery pack, a plurality of battery modules and an air-cooling fan configured to cool the plurality of battery modules are accommodated in a battery case. In the case where the plurality of battery modules and the air-cooling fan are arranged in the battery case, since a rotary shaft of the fan has high hardness, each module is arranged so as not to be positioned at a movement destination of the fan in case a load is input from the outside. As a result, even when the fan is moved by the load at the time of collision, the rotary shaft of the fan is prevented from being damaged or short-circuited due to contact with a cell.

However, in order to downsize and densify the vehicle battery pack, it is desirable to arrange the battery module also at the movement destination of the fan.

SUMMARY

The present disclosure provides a vehicle battery pack capable of preventing contact between a rotary shaft of a fan and a cell even when a battery module is arranged at a movement destination of the fan.

According to an aspect of the present disclosure, there is provided a vehicle battery pack including:

a first battery module and a second battery module each formed by stacking a plurality of cells in a first direction, each of the plurality of cells being hexahedron;

a fan which includes a blade body configured to rotate about a rotary shaft, the fan being configured to supply air to the first battery module and the second battery module; and a housing configured to accommodate the first battery module, the second battery module, and the fan, in which:

the first battery module and the second battery module are arranged side by side in a second direction orthogonal to the first direction;

in the first battery module, the plurality of cells are bound in the first direction by a binding member;

the binding member is a plate-like member which is made of metal; and the fan is arranged in such a manner that the rotary shaft faces the binding member.

According to the present disclosure, even when the fan is arranged to face one of the first battery module and the second battery module, the rotary shaft faces the binding member which is used for fixing, and thus the rotary shaft having high hardness can be prevented from coming into direct contact with the cell even if the fan is moved by an external force.

DESCRIPTION OF EMBODIMENTS

Figure 1:
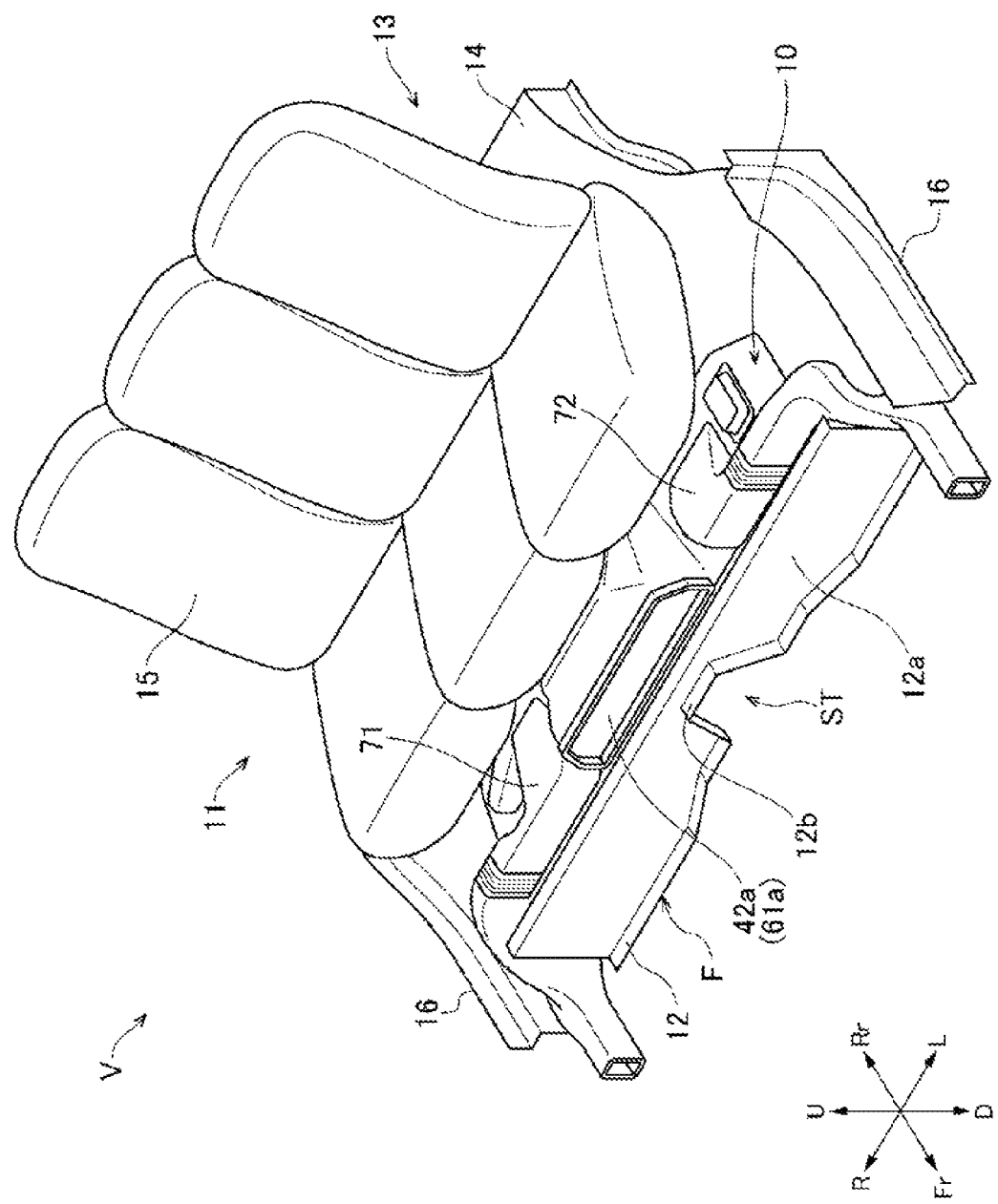
FIG. 1 is a perspective view of a periphery of a rear seat 15 of a vehicle V where a vehicle battery pack 10 according to an embodiment of the present disclosure is mounted, as viewed obliquely from a front upper side.

Hereinafter, an embodiment of a vehicle battery pack according to the present disclosure will be described with reference to the accompanying drawings. It should be noted that the drawings are viewed in directions of reference numerals. In addition, in the present specification and the like, in order to simplify and clarify the description, a front-rear direction, a left-right direction, and an up-down direction are described in accordance with directions viewed from a driver of a vehicle. In the drawings, a front side of the vehicle is denoted by Fr, a rear side thereof is denoted by Rr, a left side thereof is denoted by L, a right side thereof is denoted by R, an upper side thereof is denoted by U, and a lower side thereof is denoted by D.

<Vehicle>

As illustrated in FIG. 1, a vehicle V of the present embodiment is, for example, a hybrid vehicle, and a battery pack 10 (hereinafter, referred to as the battery pack 10) is mounted thereon. The battery pack 10 is arranged in an accommodation recess (not illustrated) recessed in a floor panel F, and is fastened to the floor panel F.

The floor panel F includes a front floor panel 12 which constitutes a floor portion of a vehicle cabin 11, and a rear floor panel 14 which constitutes a floor portion of a luggage compartment 13, and the like. The front floor panel 12 and the rear floor panel 14 are connected below a rear seat 15. Both ends of the floor panel F in a vehicle width direction are connected to a pair of left and right frame members 16 extending along the front-rear direction. As a result, the floor panel F is fixed to the frame members 16.

A kick-up portion 12a which rises upward is formed at a rear end of the front floor panel 12. In addition, a center tunnel 12b is formed along the front-rear direction at a central portion of the front floor panel 12 in the vehicle width direction. The center tunnel 12b is bent in such a manner that the front floor panel 12 protrudes upward. A trapezoidal tunnel space ST is formed below the center tunnel 12b. An exhaust pipe 17 (see FIG. 3) which discharges exhaust gas from an internal combustion engine (not illustrated) to the rear of the vehicle V may be arranged in the tunnel space ST.

The accommodation recess (not illustrated) which accommodates the battery pack 10 is recessed in a front side of the rear floor panel 14.

<Battery Pack>

Figure 2:
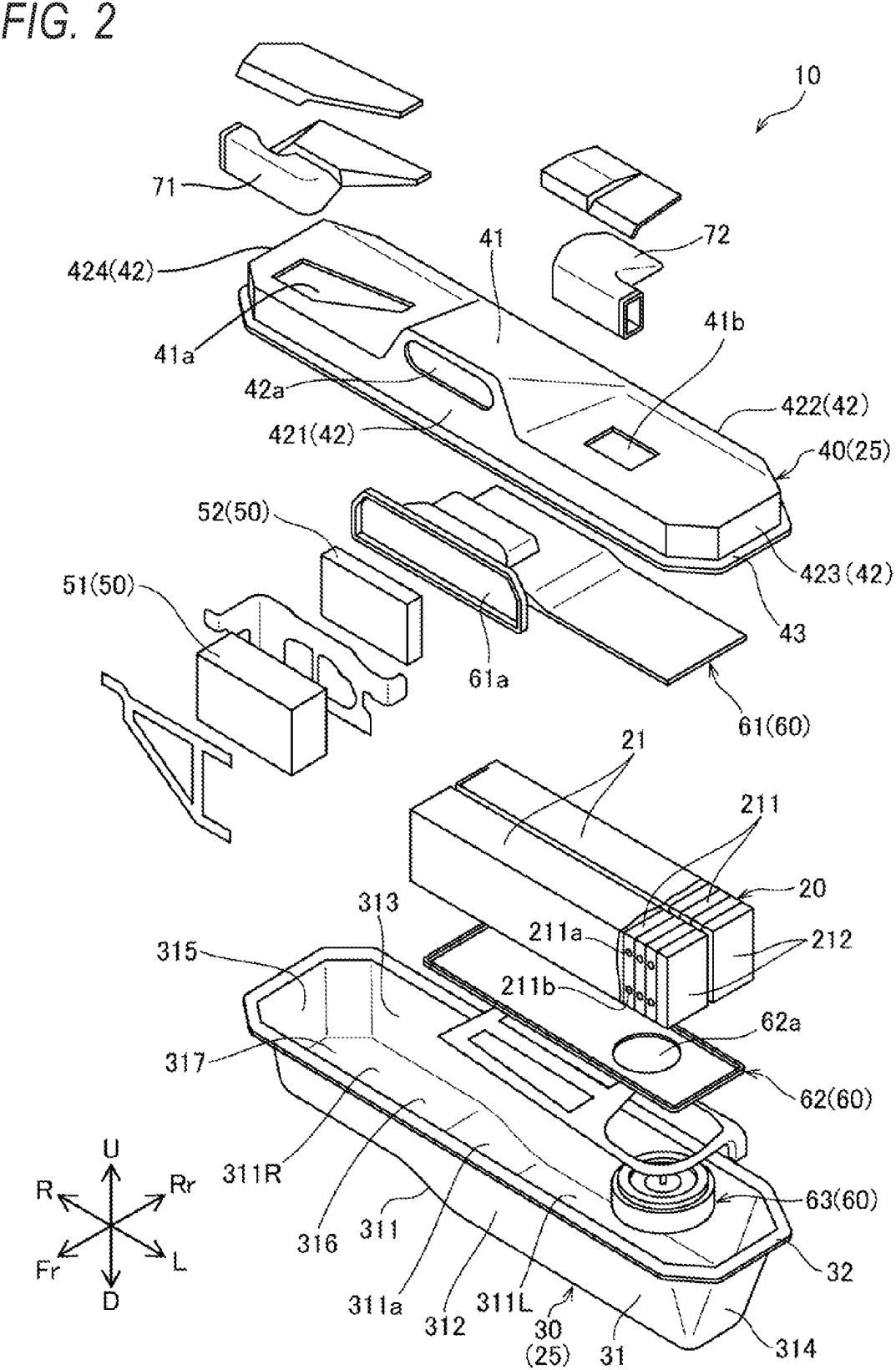
FIG. 2 is an exploded perspective view of the vehicle battery pack 10.
Figure 3:
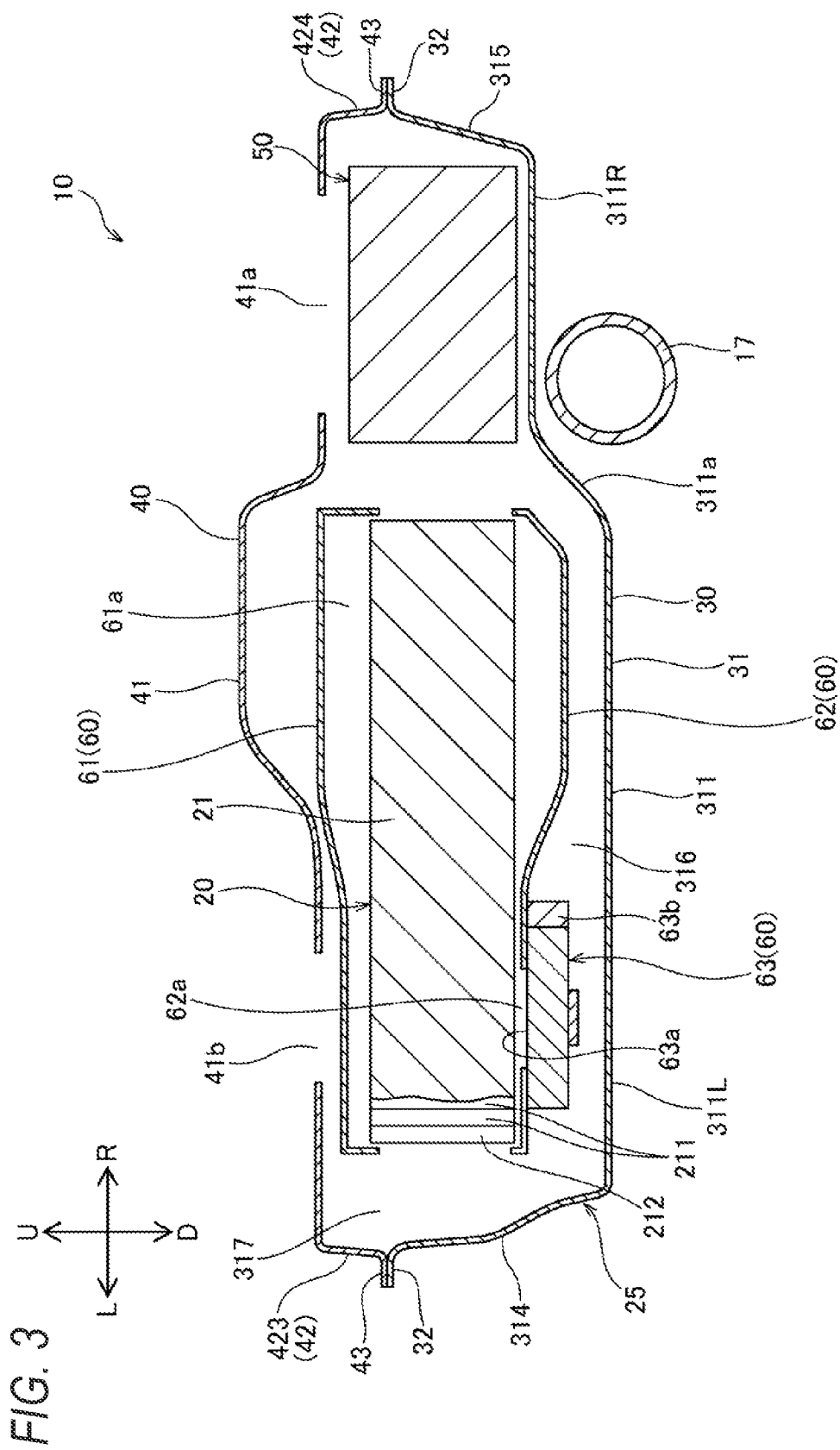
FIG. 3 is a cross-sectional view of the vehicle battery pack 10.

As illustrated in FIGS. 2 and 3, the battery pack 10 includes a battery 20, an electric device 50 arranged side by side with the battery 20, and a housing 25 which accommodates the battery 20 and the electric device 50. A cooling unit 60 is also accommodated in the housing 25. The housing 25 includes a case 30 which includes a case opening 317, and a cover 40 which covers the case opening 317 of the case 30. When the battery pack 10 is manufactured, the battery 20, the electric device 50, and the cooling unit 60 are accommodated in the case 30 through the case opening 317.

The case 30 is a resin member having a substantially rectangular parallelepiped shape which is opened upward and elongated in a vehicle width direction. The case 30 includes a case body 31 which is opened upward and an annular flange portion 32 which extends outward from an upper end of the case body 31.

The case body 31 includes a quadrangular bottom portion 311 which is elongated in the vehicle width direction, a front wall portion 312 which extends to rise upward from a front edge of the bottom portion 311, a rear wall portion 313 which extends to rise upward from a rear edge of the bottom portion 311, a left wall portion 314 which extends to rise upward from a left edge of the bottom portion 311, and a right wall portion 315 which extends to rise upward from a right edge of the bottom portion 311. The flange portion 32 extends outward from a peripheral edge of the case opening 317 surrounded by upper ends of the front wall portion 312, the rear wall portion 313, the left wall portion 314, and the right wall portion 315. In the case body 31, an accommodating portion 316 surrounded by the bottom portion 311, the front wall portion 312, the rear wall portion 313, the left wall portion 314, and the right wall portion 315 is formed.

The battery 20 and the electric device 50 are arranged side by side in the vehicle width direction in the accommodating portion 316.

The bottom portion 311 of the case body 31 includes a left bottom portion 311L extending in the front-rear and left-right directions, a right bottom portion 311R extending in the front-rear and left-right directions on the right side above the left bottom portion 311L, and an inclined portion 311a which connects the left bottom portion 311L and the right bottom portion 311R and is inclined upward toward the right side.

The exhaust pipe 17 extending in the front-rear direction is arranged below the bottom portion 311 of the case body 31. The exhaust pipe 17 is arranged below the right bottom portion 311R at a position facing the inclined portion 311a.

The cover 40 is a member which covers the case opening 317 of the case body 31 and closes the case opening 317. The cover 40 includes a ceiling portion 41 formed in substantially the same shape as a shape of the opening of the case body 31 in a top view, an annular peripheral wall 42 extending downward from an outer peripheral edge of the ceiling portion 41, and a flange portion 43 extending outward from a lower end of the peripheral wall 42 over an entire periphery thereof. The peripheral wall 42 includes a front wall portion 421 extending downward from a front edge of the ceiling portion 41, a rear wall portion 422 extending downward from a rear edge of the ceiling portion 41, a left wall portion 423 extending downward from a left edge of the ceiling portion 41, and a right wall portion 424 extending downward from a right edge of the ceiling portion 41.

The front wall portion 421 of the peripheral wall 42 of the cover 40 is formed with an air intake port 42a through which air in the vehicle cabin 11 is taken into the case 30.

A first exhaust port 41a and a second exhaust port 41b through which air circulating inside the case 30 is discharged are provided at two positions, left and right, in the ceiling portion 41 of the cover 40 so as to be spaced apart from each other. A first exhaust duct 71 is connected to the first exhaust port 41a, and a second exhaust duct 72 is connected to the second exhaust port 41b.

The flange portion 43 is overlapped with the flange portion 32 of the case 30 over an entire periphery thereof in a top view. The flange portion 32 of the case 30 and the flange portion 43 of the cover 40 are fixed by bolts or the like (not illustrated) in a state where an annular seal member (not illustrated) is interposed therebetween.

In this way, the accommodating portion 316 of the case 30 is a space surrounded by the bottom portion 311, the front wall portion 312, the rear wall portion 313, the left wall portion 314, and the right wall portion 315 of the case body 31, and the cover 40.

The battery 20 includes a plurality of (two in the present embodiment) battery modules 21. Each battery module 21 is formed by stacking a plurality of battery cells 211 in the vehicle width direction. Each battery module 21 has a substantially rectangular parallelepiped shape elongated in the vehicle width direction. The plurality of battery modules 21 are arranged side by side in the front-rear direction of the vehicle V so as to overlap each other when viewed from the front of the vehicle V.

Each battery cell 211 includes a positive electrode terminal 211a and a negative electrode terminal 211b as output terminals. The positive electrode terminal 211a is connected to the negative electrode terminal 211b of the adjacent battery cell 211 on one side, and the negative electrode terminal 211b is connected to the positive electrode terminal 211a of the adjacent battery cell 211 on the other side, and thus the plurality of battery cells 211 are connected in series.

The positive electrode terminal 211a and the negative electrode terminal 211b of the battery cell 211 are provided on a front surface of the battery cell 211.

The electric device 50 is a device which charges and discharges the battery 20. The electric device 50 includes, for example, a junction board 51 where a wiring component through which charging and discharging power of the battery 20 flows is mounted, and a battery ECU 52 which controls the charging and discharging of the battery 20.

The cooling unit 60 is a unit which takes in the air in the vehicle cabin 11 from the air intake port 42a of the cover 40 into the accommodating portion 316 of the case 30, cools the battery 20 and the electric device 50 with the taken air, and discharges the air to the outside of the case 30 after the cooling. The cooling unit 60 includes an upper surface covering material 61, a lower surface covering material 62, and a fan 63.

The upper surface covering material 61 is a resin member which is arranged in the accommodating portion 316 of the case 30 and covers an upper surface of the battery 20. A space through which air can flow is formed between the upper surface covering material 61 and the upper surface of the battery 20. Further, a space through which air can flow is formed between the upper surface covering material 61 and the ceiling portion 41 of the cover 40. In addition, the upper surface covering member 61 is provided with an air intake portion 61a which takes in air from the air intake port 42a of the cover 40 to the upper surface of the battery 20. The air intake portion 61a is opened forward and takes in the air in the vehicle cabin 11 from the air intake port 42a of the cover 40.

The lower surface covering material 62 is a resin member which is arranged in the accommodating portion 316 of the case 30 and covers a lower surface of the battery 20. A space through which air can flow is formed between the lower surface covering material 62 and the lower surface of the battery 20. Further, a space through which air can flow is formed between the lower surface covering material 62 and the bottom portion 311 of the case body 31. In addition, the lower surface covering material 62 is provided with an exhaust portion 62a which is opened downward. The exhaust portion 62a discharges the air above the lower surface covering material 62, which is taken in from the air intake port 42a of the cover 40 to cool the battery 20, to a space formed below the lower surface covering material 62, specifically, between the lower surface covering material 62 and the bottom portion 311 of the case body 31.

The fan 63 is attached to the lower surface covering member 62 so as to cover the exhaust portion 62a, takes in the air above the lower surface covering member 62, which is taken in from the air intake port 42a of the cover 40 to cool the battery 20, from the exhaust portion 62a of the lower surface covering member 62, and discharges the air to the space formed between the lower surface covering member 62 and the bottom portion 311 of the case body 31.

In the present embodiment, the fan 63 is a sirocco fan attached to a lower surface of the lower surface covering member 62. An air intake port 63a is formed in an upper surface portion of the fan 63, and an exhaust port 63b is formed in an outer peripheral portion of the fan 63. The exhaust port 63b is formed in the outer peripheral portion on a side where the electric device 50 is arranged. The fan 63 takes in the air above the lower surface covering material 62, which has cooled the battery 20, from the exhaust portion 62a to the air intake port 63a, and discharges the air toward the electric device 50 to the space formed between the lower surface covering material 62 and the bottom portion 311 of the case 30. The discharged air is guided by the inclined portion 311a of the bottom portion 311 so as to smoothly flow toward the electric device 50.

In this way, since air outside the case 30 is forcibly taken in from the air intake portion 61a of the upper surface covering material 61 by driving the fan 63, the low-temperature air outside the case 30 taken in from the air intake portion 61a is supplied to the battery 20. The air which cools the battery 20 and is thus heated is forcibly discharged to the space formed between the lower surface covering material 62 and the bottom portion 311 of the case body 31 to cool the electric device 50, and is then discharged into the vehicle cabin from the first exhaust duct 71 and the second exhaust duct 72. As a result, the battery 20 and the electric device 50 are cooled by the low-temperature air taken in from the outside of the case 30.

Next, a detailed configuration of the battery module 21 and the fan 63 and an arrangement configuration of the battery module 21 and the fan 63 will be described with reference to FIGS. 4 and 5.

Figure 4:
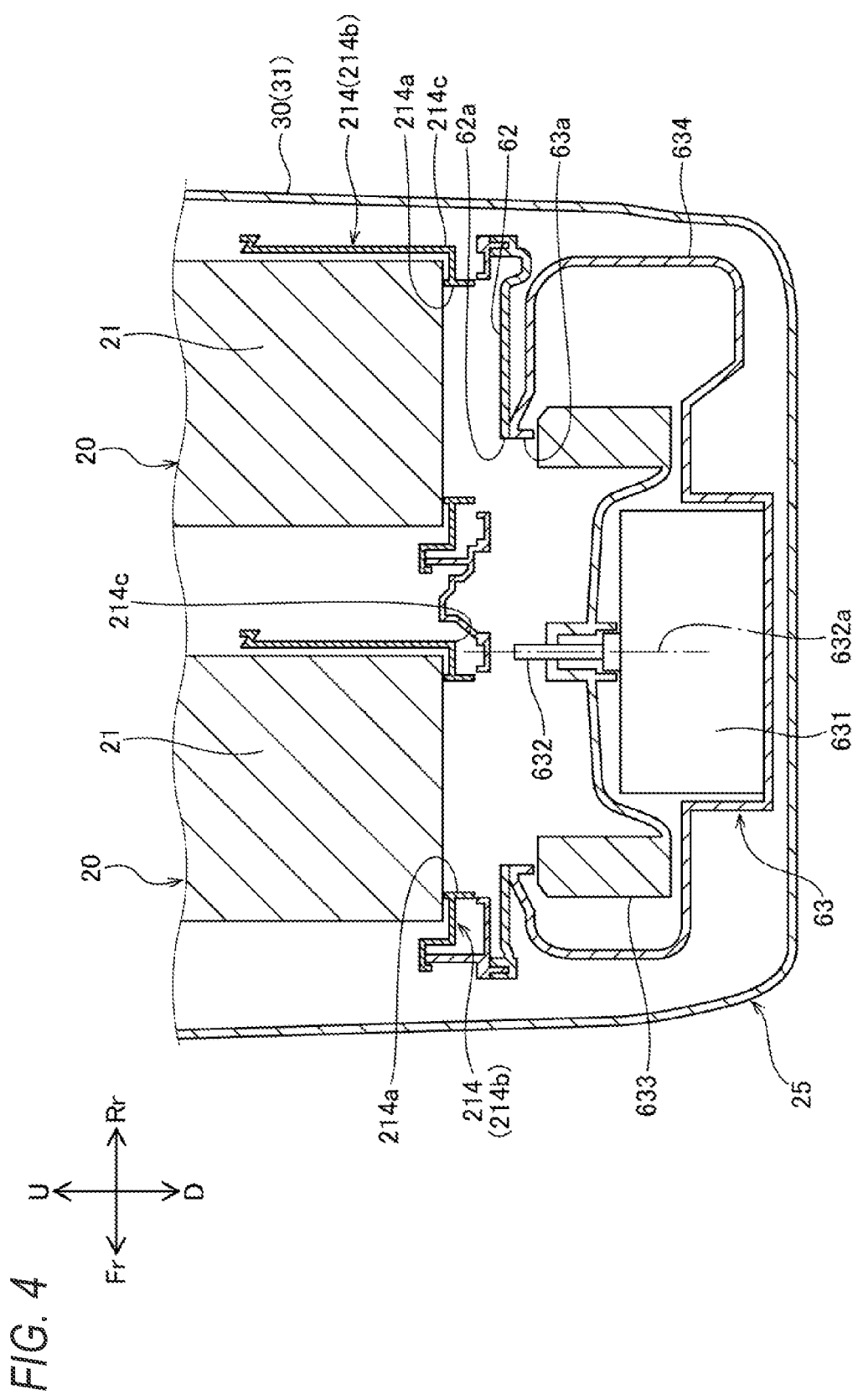
FIG. 4 is another cross-sectional view of the vehicle battery pack 10.
Figure 5:
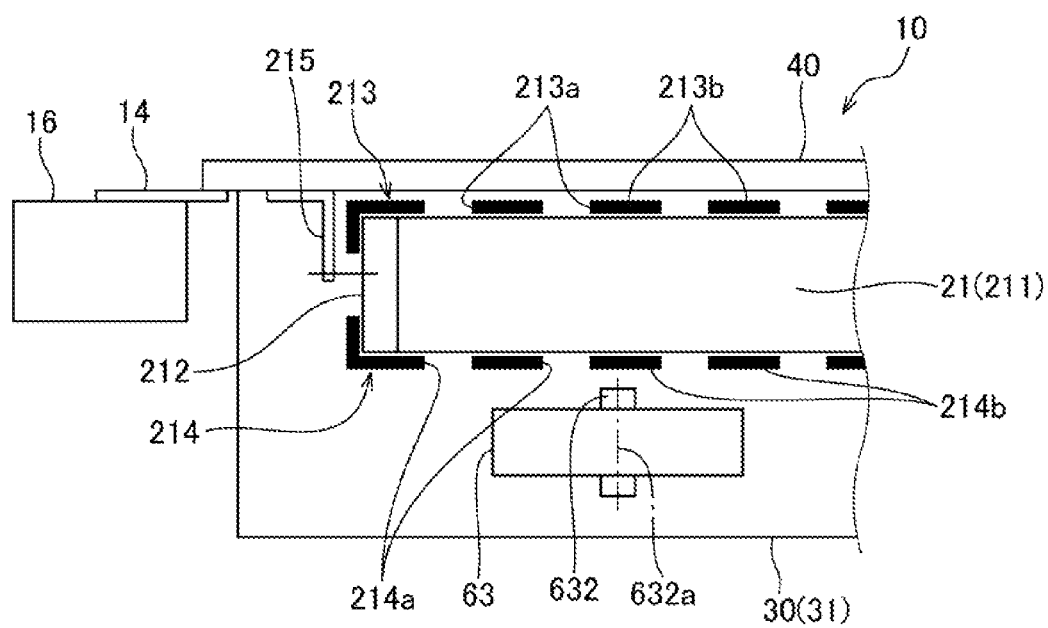
FIG. 5 is a schematic diagram illustrating an example of a load path configuration of the vehicle battery pack 10.

As illustrated in FIGS. 4 and 5, the battery module 21 includes the plurality of battery cells 211 stacked in the vehicle width direction, a pair of end plates 212 arranged at both ends of the plurality of stacked battery cells 211, an upper binding member 213 which covers an upper surface of the battery module 21 and whose both ends in the vehicle width direction are fixed to the pair of end plates 212 so as to bind the plurality of battery cells 211 in the vehicle width direction, and a lower binding member 214 which covers a lower surface of the battery module 21 and whose both ends in the vehicle width direction are fixed to the pair of end plates 212 so as to bind the plurality of battery cells 211 in the vehicle width direction.

The upper binding member 213 and the lower binding member 214 are plate-like members which are made of metal. A plurality of openings 213a and 214a through which cooling air passes are formed in frame portions 213b and 214b. In addition, at least the lower binding member 214 includes a corner portion 214c along two surfaces (a lower surface and a rear surface) of each battery cell 211, which is a hexahedron.

The fan 63 includes a fan motor 631, a blade body 633 provided to be integrally rotatable with a rotary shaft 632 of the fan motor 631, and a fan case 634 which accommodates the fan motor 631 and the blade body 633. Since the rotary shaft 632 of the fan 63 has high hardness, it is necessary to determine an arrangement of the fan 63 in case a load is input from the outside. However, in order to downsize and densify the battery pack 10, it is desirable to arrange the battery module 21 at a movement destination of the fan 63 even when it is assumed that an external load (hereinafter, also referred to as the external force) is input.

Therefore, in the battery pack 10 of the present embodiment, the rotary shaft 632 of the fan 63 is arranged to face the lower binding member 214. As a result, even when the fan 63 is arranged to face the battery module 21, direct contact with the battery cell 211 can be prevented even when the rotary shaft 632 having high hardness moves along with movement of the fan 63 due to the external force. A reference numeral 632a denotes a rotary shaft center of the rotary shaft 632.

In addition, the rotary shaft 632 of the fan 63 is arranged so as to face the frame portion 214b of the lower binding member 214 other than the opening 214a of the lower binding member 214. As a result, even when the rotary shaft 632 is moved due to the external force, the rotary shaft 632 can be prevented from passing through the opening 214a of the lower binding member 214 and coming into direct contact with the battery cell 211.

In addition, as illustrated in FIG. 4, the rotary shaft 632 of the fan 63 is preferably arranged to face the corner portion 214c of the lower binding member 214. With this configuration, the rotary shaft 632 faces the corner portion 214c of the lower binding member 214 having high rigidity, and thus movement of the fan 63 can be restrained.

In addition, as illustrated in FIG. 5, the lower binding member 214 is fixed to the pair of end plates 212, and the pair of end plates 212 are fixed to the cover 40 via a bracket 215. With this configuration, since a load path including the lower binding member 214, the end plates 212, the bracket 215, and the cover 40 is formed, even when an impact load acts from below the vehicle on the rotary shaft 632 of the fan 63 arranged below the battery module 21, the load can be transmitted to the cover 40 via the load path, and thus the load can be prevented from being input to the battery cell 211.

Although the end plates 212 are fixed to the cover 40 in the example illustrated in FIG. 5, the upper binding member 213 may also be fixed to the cover 40. In this case, a load path including the lower binding member 214, the end plates 212, the upper binding member 213, and the cover 40 can be formed.

In addition, since the positive electrode terminal 211a and the negative electrode terminal 211b of each battery cell 211 of the battery module 21 are arranged to face a horizontal direction (the front in the present embodiment), contact with the positive electrode terminal 211a and the negative electrode terminal 211b of the battery cell 211 can be prevented even when the rotary shaft 632 of the fan 63 is moved due to the external force.

<Modification>

Next, the battery pack 10 according to a modification will be described with reference to FIG. 6. However, for configurations common to those of the above embodiment, the description of the above embodiment may be incorporated herein by using the reference numerals of the above embodiment.

Figure 6:
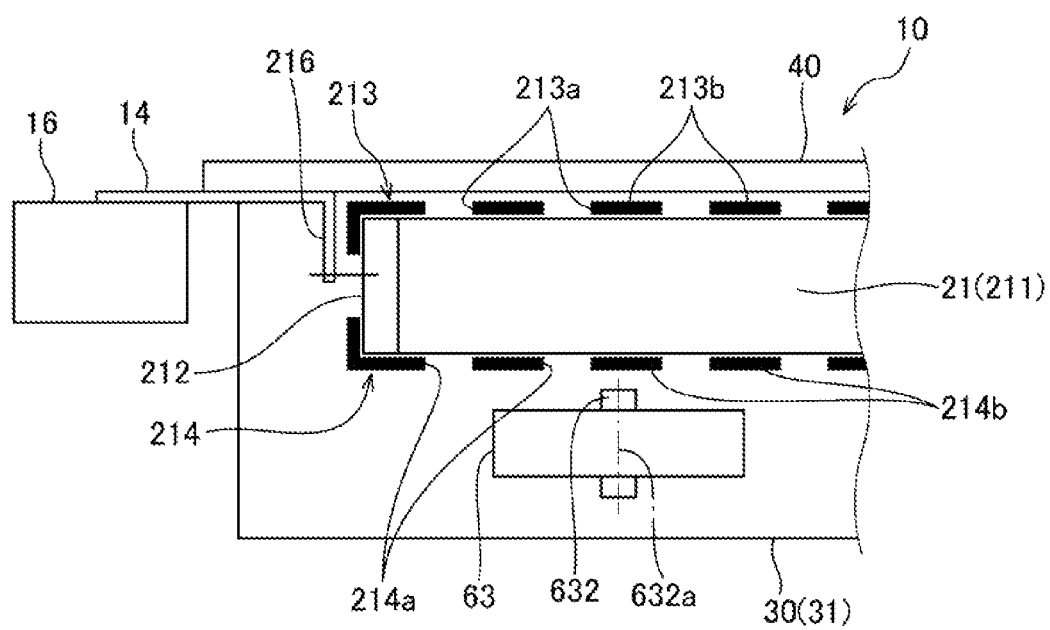
FIG. 6 is a schematic diagram illustrating another example of the load path configuration of the vehicle battery pack 10.

As illustrated in FIG. 6, the battery pack 10 of the modification is different from the above-described embodiment in that the pair of end plates 212 are each fixed to the frame member 16 of the vehicle V via a bracket 216. According to the battery pack 10 of the modification, since a load path including the lower binding member 214, the end plates 212, the bracket 216, and the frame member 16 (vehicle body) is formed, the load caused by the rotary shaft 632 of the fan 63 can be prevented from being input to the battery cell 211.

Although one embodiment of the present disclosure has been described above with reference to the accompanying drawings, it is needless to say that the present disclosure is not limited to the embodiment. It is apparent that those skilled in the art can conceive of various modifications and alterations within the scope described in the claims, and it is understood that such modifications and alterations naturally fall within the technical scope of the present disclosure. In addition, the constituent elements in the above embodiment may be combined as desired without departing from the spirit of the disclosure.

For example, the plurality of battery cells 211 may be stacked in the front-rear direction, and the plurality of battery modules 21 may be arranged side by side in the vehicle width direction of the vehicle V so as to overlap each other when viewed from a lateral side of the vehicle V.

In addition, the fan 63 may be arranged above the battery module 21 in such a manner that the rotary shaft 632 faces the upper binding member 213.

In the present specification, at least the following matters are described. In parentheses, the corresponding constituent elements and the like in the above-described embodiment are shown as an example, but the present disclosure is not limited thereto.

(1) A vehicle battery pack (vehicle battery pack 10) includes: a first battery module (battery module 21) and a second battery module (battery module 21) each formed by stacking a plurality of cells (battery cells 211) in a first direction (vehicle width direction), each of the plurality of cells being hexahedron;
a fan (fan 63) which includes a blade body (blade body 633) configured to rotate about a rotary shaft (rotary shaft 632), the fan being configured to supply air to the first battery module and the second battery module; and
a housing (housing 25) configured to accommodate the first battery module, the second battery module, and the fan.

The first battery module and the second battery module are arranged side by side in a second direction (front-rear direction) orthogonal to the first direction.

In the first battery module, the plurality of cells are bound in the first direction by a binding member (upper binding member 213, lower binding member 214).

The binding member is a plate-like member which is made of metal.

The fan is arranged in such a manner that the rotary shaft faces the binding member.

According to (1), even when the fan is arranged to face the first battery module which is one of the first battery module and the second battery module, since the rotary shaft faces the binding member which is used for fixing, direct contact with the cell can be prevented even when the rotary shaft having high hardness moves along with movement of the fan due to an external force.

(2) The vehicle battery pack according to (1),
in which the binding member includes a frame portion (frame portions 213b and 214b) which includes an opening (openings 213a and 214a) through which the air passes, and
the fan is arranged in such a manner that the rotary shaft faces the frame portion.

According to (2), it is rational to provide the opening in the binding member in order to guide air to the cell. Since a shaft center of the rotary shaft is abutted against the frame portion, the shaft center can be prevented from coming into direct contact with the cell through the opening even when the rotary shaft is moved.

(3) The vehicle battery pack according to (2),
in which the frame portion includes a corner portion (corner portion 214c) along two surfaces of the hexahedron, and
the rotary shaft faces the corner portion.

According to (3), since the rotary shaft faces the corner portion of the binding member having high rigidity, movement of the fan can be restrained.

(4) The vehicle battery pack according to (2) or (3),
in which the first battery module includes a pair of end plates (end plates 212) at both ends of the plurality of cells in the first direction,
the binding member is fixed to the pair of end plates,
the housing includes a case (case 30) and a cover (cover 40) which covers an opening (case opening 317) of the case, and
the pair of end plates are fixed to the cover.

According to (4), since a load path including the binding member, the end plates, and the cover is formed, a load caused by the rotary shaft of the fan can be prevented from being input to the cell.

(5) The vehicle battery pack according to (4),
in which the first direction and the second direction are two directions orthogonal to each other in a horizontal plane, and
the fan is arranged below the first battery module and the second battery module.

According to (5), an impact load from below the vehicle can be transmitted to the cover via the load path.

(6) The vehicle battery pack according to (5),
in which each output terminal (positive electrode terminal 211a, negative electrode terminal 211b) of the first battery module is arranged to face a horizontal direction.

According to (6), the rotary shaft of the fan can be prevented from coming into contact with the output terminal of the cell.

(7) The vehicle battery pack according to (6),
in which the binding member includes an upper binding member (upper binding member 213) which covers an upper surface of the first battery module and a lower binding member (lower binding member 214) which covers a lower surface of the first battery module,
the upper binding member and the lower binding member are fixed to the pair of end plates, respectively,
the fan faces the lower binding member, and
the upper binding member is fixed to the cover.

According to (7), since a load path including the lower binding member, the end plates, the upper binding member, and the cover is formed, the load caused by the rotary shaft of the fan can be prevented from being input to the cell.

(8) The vehicle battery pack according to (2) or (3),
in which the first battery module includes a pair of end plates (end plates 212) at both ends of the plurality of cells in the first direction,
the binding member is fixed to the pair of end plates,
the housing includes a case (case 30) and a cover (cover 40) which covers an opening (case opening 317) of the case, and
the pair of end plates are fixed to a vehicle body (frame member 16) via a bracket (brackets 216).

According to (8), since a load path including the binding member, the end plates, the bracket, and the vehicle body is formed, the load caused by the rotary shaft of the fan can be prevented from being input to the cell.

The invention claimed is:

1. A vehicle battery pack comprising:
a first battery module and a second battery module each formed by stacking a plurality of cells in a first direction, each of the plurality of cells being hexahedron;
a fan which includes a blade body configured to rotate about a rotary shaft, the fan being configured to supply air to the first battery module and the second battery module; and
a housing configured to accommodate the first battery module, the second battery module, and the fan, wherein:
the first battery module and the second battery module are arranged side by side in a second direction orthogonal to the first direction;
in the first battery module, the plurality of cells are bound in the first direction by a binding member;
the binding member is a plate-like member which is made of metal;
the fan is arranged in such a manner that the rotary shaft faces the binding member;
the binding member includes a frame portion which includes an opening through which the air passes; and
the fan is arranged in such a manner that an axis along which the rotary shaft rotates intersects with the frame portion.

2. The vehicle battery pack according to claim 1, wherein:
the frame portion includes a corner portion along two surfaces of the hexahedron; and
the rotary shaft faces the corner portion.

3. The vehicle battery pack according to claim 1, wherein:
the first battery module includes a pair of end plates at both ends of the plurality of cells in the first direction;
the binding member is fixed to the pair of end plates;
the housing includes a case and a cover which covers an opening of the case; and
the pair of end plates are fixed to the cover.

4. The vehicle battery pack according to claim 3, wherein:
the first direction and the second direction are two directions orthogonal to each other in a horizontal plane; and
the fan is arranged below the first battery module and the second battery module.

5. The vehicle battery pack according to claim 4, wherein each output terminal of the first battery module is arranged to face a horizontal direction.

6. The vehicle battery pack according to claim 5, wherein:
the binding member includes an upper binding member which covers an upper surface of the first battery module and a lower binding member which covers a lower surface of the first battery module;
the upper binding member and the lower binding member are fixed to the pair of end plates, respectively;
the fan faces the lower binding member; and
the upper binding member is fixed to the cover.

7. The vehicle battery pack according to claim 1, wherein:
the first battery module includes a pair of end plates at both ends of the plurality of cells in the first direction;
the binding member is fixed to the pair of end plates;
the housing includes a case and a cover which covers an opening of the case; and
the pair of end plates are fixed to a vehicle body via a bracket.

* * * * *